United States Patent
Turvey et al.

(10) Patent No.: US 10,797,574 B2
(45) Date of Patent: Oct. 6, 2020

(54) ELECTRICAL MACHINE

(71) Applicant: ROLLS-ROYCE plc, London (GB)

(72) Inventors: Simon Turvey, Birmingham (GB); Keir Wilkie, Sheffield (GB)

(73) Assignee: ROLLS -ROYCE plc, London (GB)

( * ) Notice: Subject to any disclaimer, the term of this patent is extended or adjusted under 35 U.S.C. 154(b) by 50 days.

(21) Appl. No.: 15/990,391

(22) Filed: May 25, 2018

(65) Prior Publication Data
US 2018/0367017 A1 Dec. 20, 2018

(30) Foreign Application Priority Data

Jun. 14, 2017 (GB) .................................. 1709455.8

(51) Int. Cl.
| | |
|---|---|
| *H02P 9/00* | (2006.01) |
| *H02K 21/02* | (2006.01) |
| *F02C 7/268* | (2006.01) |
| *H02K 1/27* | (2006.01) |
| *H02K 7/116* | (2006.01) |
| *H02K 7/18* | (2006.01) |
| *H02K 11/04* | (2016.01) |
| *H02K 16/02* | (2006.01) |
| *H02P 27/08* | (2006.01) |
| *F02C 7/32* | (2006.01) |

(52) U.S. Cl.
CPC .......... *H02K 21/024* (2013.01); *F02C 7/268* (2013.01); *H02K 1/2753* (2013.01); *H02K 7/116* (2013.01); *H02K 7/1823* (2013.01); *H02K 11/048* (2013.01); *H02K 16/02* (2013.01); *H02K 21/029* (2013.01); *H02P 9/006* (2013.01); *F02C 7/32* (2013.01); *F05D 2260/85* (2013.01); *H02P 27/08* (2013.01); *H02P 2207/03* (2013.01)

(58) Field of Classification Search
CPC ...... H02P 2207/03; H02P 27/08; H02P 9/006; F02C 7/268; F02C 7/32; F05D 2260/85; H02K 11/048; H02K 16/02; H02K 1/2753; H02K 21/029; H02K 7/1823
USPC ..................................................... 290/52, 46
See application file for complete search history.

(56) References Cited

U.S. PATENT DOCUMENTS

| | | | | |
|---|---|---|---|---|
| 3,713,015 A | * | 1/1973 | Frister ................. | H02K 1/2726 322/28 |
| 5,821,710 A | | 10/1998 | Masuzawa et al. | |

(Continued)

*Primary Examiner* — Julio C. Gonzalez
(74) *Attorney, Agent, or Firm* — Oliff PLC

(57) ABSTRACT

An electrical machine has a stator with windings, first and second rotors, and an electrical output regulator. The first rotor carries alternating polarity first field magnets, such that, on drive mechanism rotation, the windings interact with the magnetic flux produced by the first magnets to create an EMF. The second rotor carries alternating polarity second field magnets, and has first and second rotational positions to reduce and increase, respectively, the magnetic flux energy. The electrical output regulator regulates a current from the windings to produce a torque on the rotors, as the drive mechanism increases from zero rotational speed, the torque rises above a threshold level that moves the second rotor from the first to the second rotational position, and, as the drive mechanism further increases the rotational speed, the torque peaks and then drops below the threshold level to move the second rotor back to the first rotational position.

11 Claims, 6 Drawing Sheets

(56) References Cited

U.S. PATENT DOCUMENTS

| | | | | |
|---|---|---|---|---|
| 6,191,561 B1* | 2/2001 | Bartel | ............... | E21B 41/0085 |
| | | | | 322/51 |
| 6,462,430 B1* | 10/2002 | Joong | ................. | B60K 6/26 |
| | | | | 290/40 C |
| 7,671,494 B2* | 3/2010 | Shibukawa | ............ | H02K 1/278 |
| | | | | 310/190 |
| 2002/0117933 A1 | 8/2002 | Joong et al. | | |
| 2004/0189128 A1 | 9/2004 | Joong et al. | | |
| 2006/0290219 A1 | 12/2006 | Rodger et al. | | |
| 2009/0140591 A1* | 6/2009 | Blessing | ............ | H02K 21/029 |
| | | | | 310/156.37 |
| 2010/0252341 A1* | 10/2010 | Shu | .................. | H02K 16/02 |
| | | | | 180/65.21 |
| 2016/0097328 A1* | 4/2016 | Wintgens | ............ | F02C 7/32 |
| | | | | 415/1 |

\* cited by examiner

ELECTRICAL MACHINE

FIELD OF THE PRESENT DISCLOSURE

The present disclosure relates to an electrical machine.

BACKGROUND

Aero gas turbine engines typically include electrical generators powered by the gas turbine, the generators are used in turn to power fuel pumps, cabin environmental controls and other engine/aircraft electrical systems.

Permanent magnet generators are a form of electrical machine that can provide high power output performance per unit volume or per unit weight at any particular speed. However, a problem with this type of machine is that the low speed performance often has to be restricted because best performance at low speed results in excessive voltage at high speed.

Various control schemes have been proposed to overcome this problem. For example, in "one-per-unit" schemes, the machine is short circuited to limit output voltage. As another example, in "field-weakening" schemes the machine's output windings are back-driven to reduce the flux levels in the stator. Both of these schemes have a disadvantage that if the output regulator fails, excessive voltages can be applied to the load.

Alternatively, mechanical schemes are known in which the rotor is moved axially relative to the stator so that less of the flux links to the stator, thus reducing the output voltage. However, such schemes, whilst theoretically simple, are often difficult to implement in practice.

Thus there is a need to be able to modulate the flux/EMF in electrical machines of this type via a scheme that is both reliable and has a safe failure mode.

SUMMARY

Accordingly, in a first aspect, the present invention provides an electrical machine having:
  a stator with windings;
  a first rotor rotatably fixed relative to a drive mechanism, the first rotor being radially inwards of the stator, the first rotor carrying alternating polarity first field magnets arranged in a circumferential direction of the first rotor, such that, on rotation of the drive mechanism, the windings interact with the magnetic flux produced by the first magnets to create an EMF across the windings; and
  a second rotor inwards of the stator, the second rotor carrying alternating polarity second field magnets arranged in a circumferential direction of the second rotor, the second rotor having a first rotational position relative to the first rotor in which the second magnets of the second rotor are aligned relative to the first magnets of the first rotor to reduce the magnetic flux energy of the combined magnets of the first and second rotors, the second rotor having a second rotational position relative to the first rotor in which the second magnets of the second rotor are aligned relative to the first magnets of the first rotor to increase the magnetic flux energy of the combined magnets of the first and second rotors, and the second rotor being freely rotatable relative to the drive mechanism at least between the first and second rotational positions; and
  an electrical output regulator configured to regulate an electrical current drawn from the windings to produce a torque on the first and second rotors such that, as the drive mechanism increases from zero rotational speed, the torque rises above a threshold level that moves the second rotor from the first rotational position to the second rotational position, and, as the drive mechanism further increases the rotational speed, the torque peaks and then drops below the threshold level to move the second rotor back to the first rotational position.

As the drop below the threshold level moves the second rotor back to the first rotational position and thereby reduces the magnetic flux energy of the combined magnets, it results in a corresponding drop in the EMF across the windings and/or a drop in the drawn electrical current.

Advantageously, as the second rotor is free to rotate relative to the drive mechanism, the alignment of the first and second magnets can be controlled purely by the produced torque driven by the speed of the machine and the output regulator. Moreover, at high speeds the magnetic flux energy of the combined magnets is reduced, which can prevent excessive voltages being applied to a load, even if the regulator fails.

In a second aspect, the present invention provides a gas turbine engine having an auxiliary gearbox and the electrical machine of the first aspect, the drive mechanism of the electrical machine being powered by the auxiliary gearbox.

Optional features of the present disclosure will now be set out. These are applicable singly or in any combination with any aspect of the present disclosure.

The first and second rotors are typically spaced from the stator by respective air gaps. However, the air gaps are preferably as small as possible.

The field magnets are typically permanent magnets.

The field magnets are radially magnetised surface magnets or they may be embedded magnets.

Conveniently, the circumferential arrangement of the first alternating polarity field magnets may be the same as the circumferential arrangement of the second alternating polarity field magnets. However, this does not exclude that the two rotors may have different circumferential arrangements.

Conveniently, the drive mechanism may be a drive shaft which extends along the axis of the first and second rotors, the second rotor being freely rotatable on the drive shaft at least between the first and second rotational positions.

The electrical machine may further have an end stop which prevents the second rotor from rotating beyond the second rotational position. Alternatively or additionally, the electrical machine may further have an end stop which prevents the second rotor from rotating beyond the first rotational position. The stop or stops may be arranged to e.g. optimise the reaction torque or EMF range. When both end stops are implemented, the second rotor can thus be physically restricted to only occupy rotational positions between the first and second rotational positions.

Conveniently, the first and second rotors may be axially adjacent each other with a sliding interface between them. Such a sliding interface can help to prevent magnetic detritus from interposing between the rotors.

The electrical output regulator may be configured to intermittently short circuit the windings as the drive mechanism increases from zero or low rotational speed with the second rotor in the first rotational position relative to the first rotor until the torque rises above the threshold level.

The electrical output regulator may be configured to perform pulse width modulation electrical output regulation.

BRIEF DESCRIPTION OF THE DRAWINGS

Embodiments of the present disclosure will now be described by way of example with reference to the accompanying drawings in which.

DETAILED DESCRIPTION AND FURTHER OPTIONAL FEATURES

Figure 1:
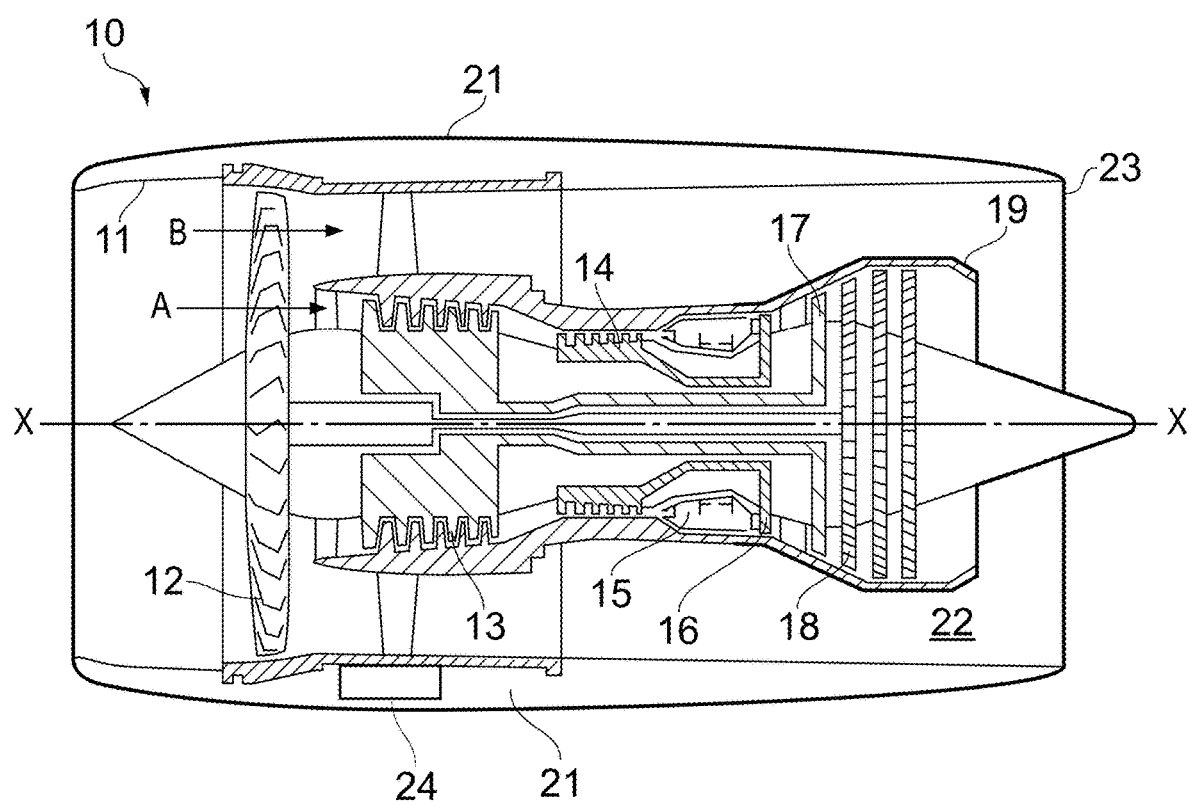
FIG. 1 shows a longitudinal cross-section through a ducted fan gas turbine engine.

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

The interconnecting shaft for the intermediate-pressure turbine 17 and compressor 13 is connected to an auxiliary gearbox 24 via a radial drive. The auxiliary gearbox in turn powers a starter/generator. Therefore as the gas-turbine engine operates it generates a torque which allows the starter/generator to produce electricity for powering aircraft systems.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 5:
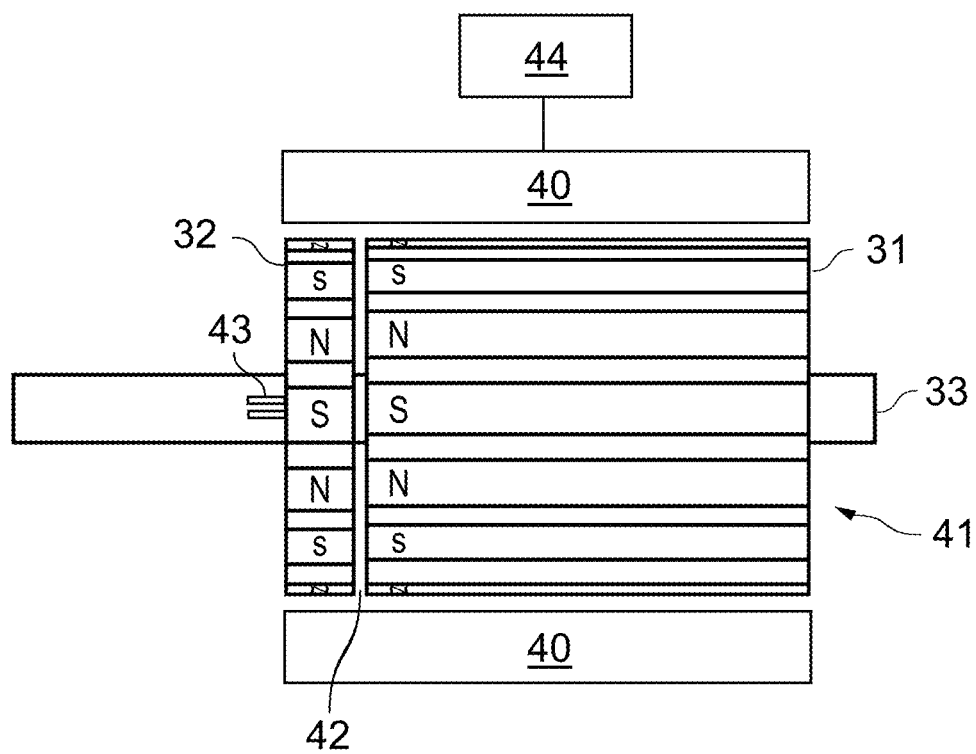
FIG. 5 shows schematically the electrical machine.

The starter/generator (discussed in more detail below), which is shown schematically in FIG. 5 is an electrical machine having a stator 40 with windings, and a rotor 41 inwards of the stator and radially spaced therefrom by an air gap, the first rotor carrying alternating polarity field magnets arranged in a circumferential direction of the first rotor, such that, on rotation of the rotor, the windings interact with the magnetic flux produced by the magnets to create an EMF across the windings. Typically the field magnets are permanent magnet. A weakness of conventional permanent magnet machines when used over a wide speed range is that the fixed flux produced by the permanent magnets is difficult to control effectively. Thus it is difficult to prevent excessive voltages being generated at high speeds. If purely regulator-based control schemes are used, increased losses are incurred, and the machine may not be suitable for safety critical applications such as FADEC (Full Authority Digital Engine Control) systems.

The electrical machine of the present disclosure addresses these difficulties by having a "split rotor" 41, i.e. a first rotor 31 and a second rotor 32 arranged so that the two rotors can be rotated relative to each other so that the total flux in the stator is the ratio of the relative pole alignment and the "split ratio" of the rotors.

Figure 2A:
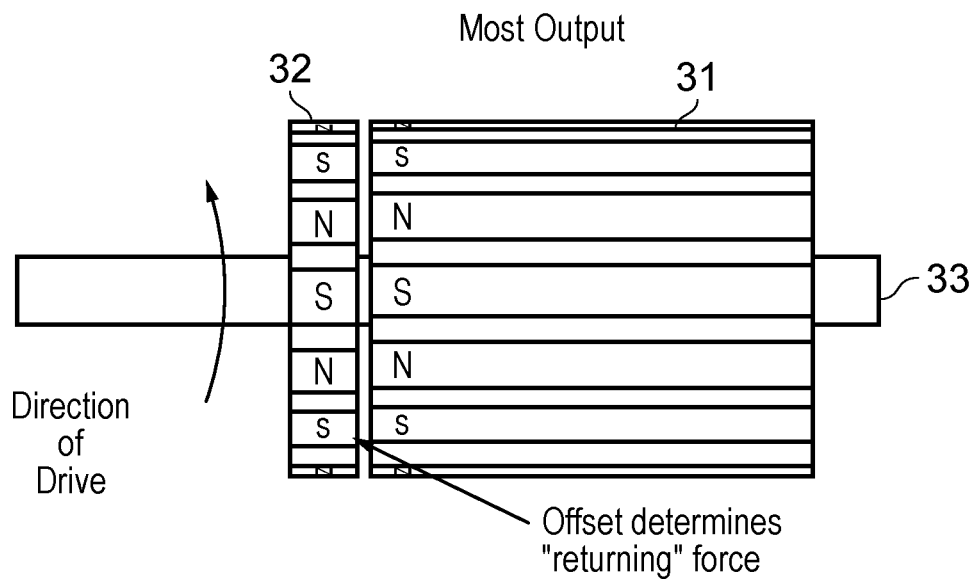
FIG. 2A shows schematically a first rotor and a second rotor of an electrical machine in an alignment for producing a high total flux in the machine's stator.
Figure 2B:
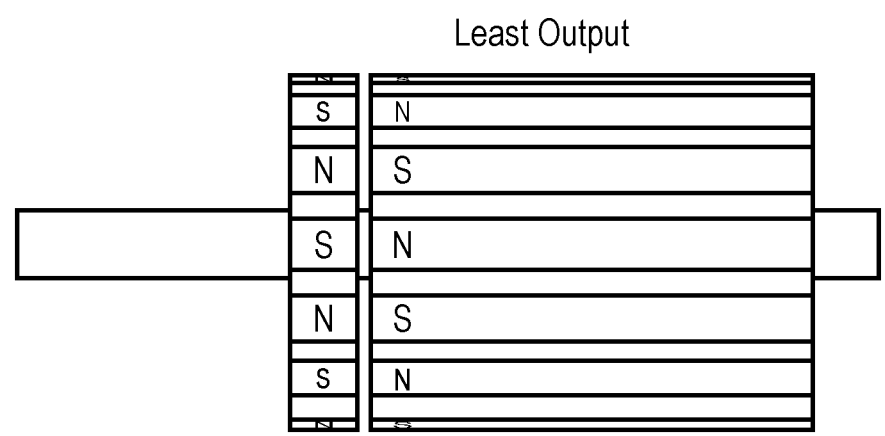
FIG. 2B shows schematically the first rotor and the second rotor of the electrical machine in an alignment for producing a low total flux in the stator.

FIGS. 2A and 2B show schematically the first rotor 31 and the second rotor 32 (a) in an alignment for producing a high total flux in the stator (FIG. 2A), and (b) in an alignment for producing a lower total flux in the stator (FIG. 2B). The rotors are both mounted on a drive mechanism in the form of a drive shaft 33, which in turn is powered by the auxiliary gearbox. The two rotors may be axially spaced apart by just a washer, providing a low-friction sliding interface 42. The first rotor is rotatably fixed relative to a drive shaft, such that when the shaft turns, the first rotor must turn with it. The second rotor, by contrast, is freely rotatable relative to the drive shaft. In particular, subject to the torque produced on the second rotor in operation (discussed below), it can move between a first rotational position shown in FIG. 2B in which the magnets of the two rotors align with opposite poles facing each other, and a second rotational position shown in FIG. 2A in which the magnets of the two rotors align with same poles facing, or almost facing, each other. Evidently, the effect of the difference in total flux for the two rotational positions is to bias the second rotor to the first position.

In the second rotational position of FIG. 2A, the total flux seen in the stator is at or close to the maximum possible. In the first rotational position of FIG. 2B, the relative axial lengths of the first 31 and second 32 rotors produce a total flux seen in the stator of about 80% maximum. However, the difference between the high and low flux can be varied by changing the relative axial lengths. If the axial lengths of the first and second rotors are the same, then the low flux seen in the stator can be zero.

Figure 6:
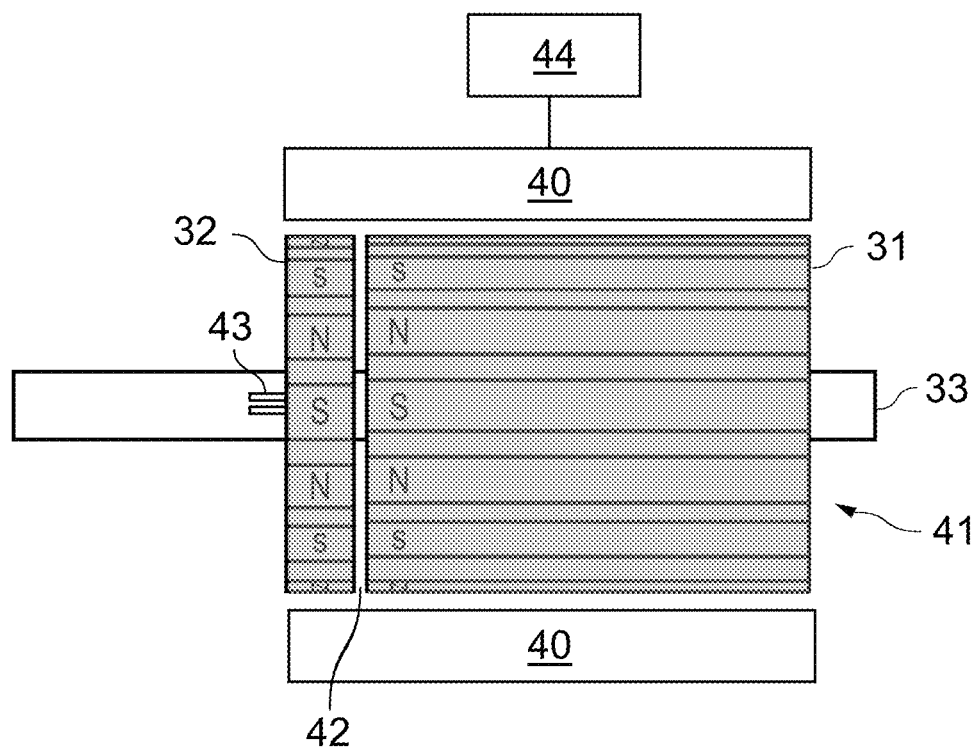
FIG. 6 shows schematically a variant of the electrical machine.

The electrical machine shown in FIGS. 2A 2B and 5 has surface magnets, in which the individual magnets are radially magnetised. However, this does not exclude that embedded magnets could be used instead, as shown schematically in the variant electrical machine of FIG. 6, in which shading indicates embedding of the magnets. Embedded magnets have an advantage that the average flux is also in the air gap so that each lamination of the stator sees average flux. In contrast, with surface magnets, the flux in the machine air gap is either maximum positive or negative, such that the averaging of the flux is performed dynamically in the stator. However, the higher peak fluxes seen in the stator with surface magnets do result in higher core losses.

The first 31 and second 32 rotors are shown in FIGS. 2A, 2B and 5 with identical arrangements of circumferentially alternating polarity magnets. This is generally the most convenient approach to adopt in practice. However, it does not exclude that the rotors could have different arrangements of magnets—as long as the second rotor can move between a low total flux first position and a high total flux second position.

An advantage of the electrical machine is that it uses the magnetic properties of the rotors (i.e. the simple attraction and repulsion of their magnetic poles) to achieve the desired result (flux/EMF modulation) without a need for active mechanical intervention.

When drive shaft 33 is stationary, the second rotor 32 adopts the first (low total flux) rotational position. When the drive shaft is turning, the machine produces energy because of a torque reaction on the drive shaft. The first rotor 31 experiences this torque reaction but is mechanical linked to the shaft so continues to rotate. However, the second rotor is free to rotate once the torque reaction reaches a threshold level that exceeds the magnetic attraction between the poles of the two rotors and can thus move to the second (high total flux) rotational position. Removal of the torque results in the second rotor returning to the first rotational position. Stops 43 can be provided to prevent the second rotor overshooting the first and second rotational positions, and thereby ensuring that the magnetic forces maintain correct polarities. The stops can be simple mechanical devices or more complex magnetic devices as required.

Figure 3:
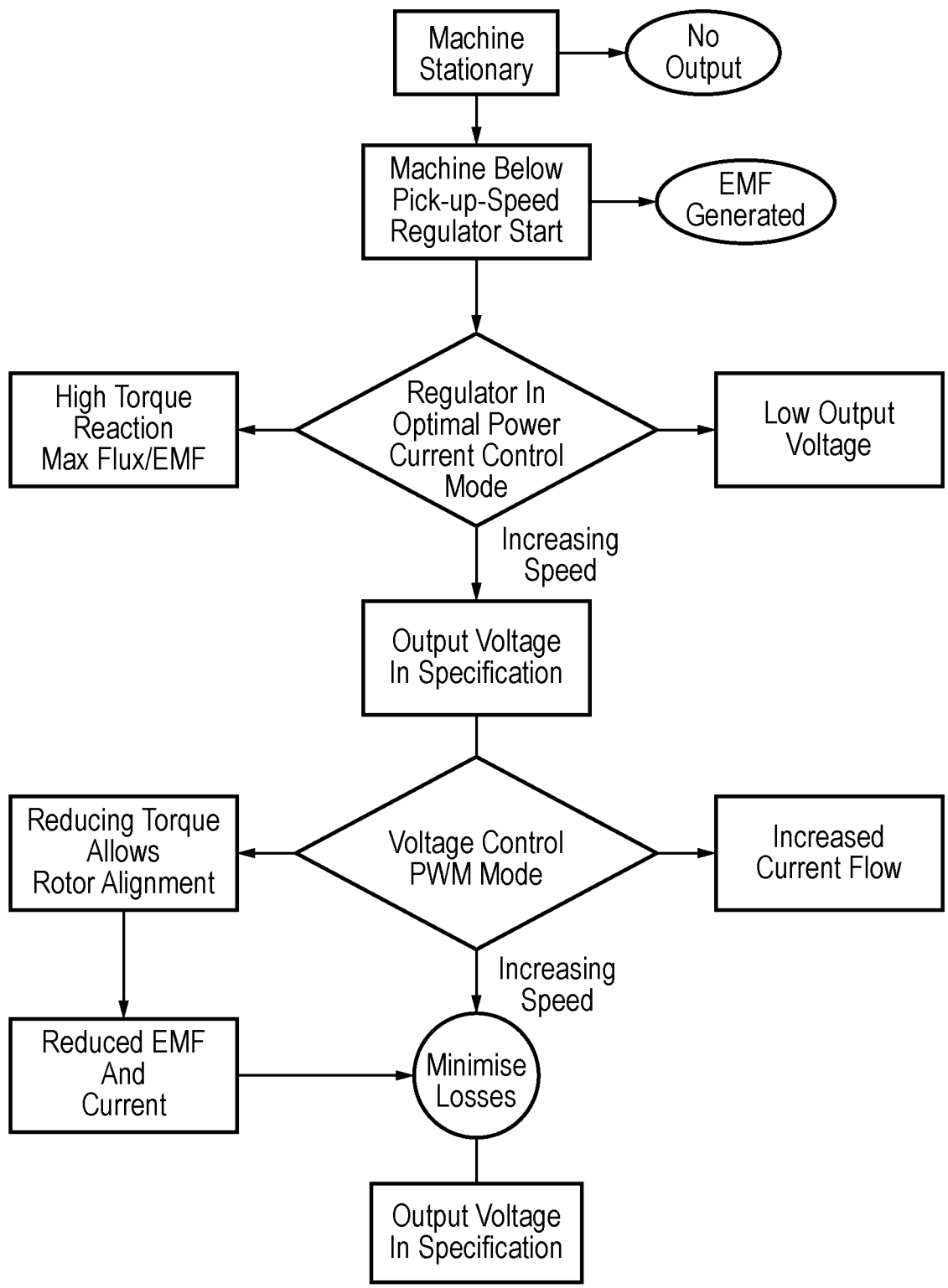
FIG. 3 shows operation steps of an electrical output regulator of the electrical machine of FIG. 2A and FIG. 2B.
Figure 4:
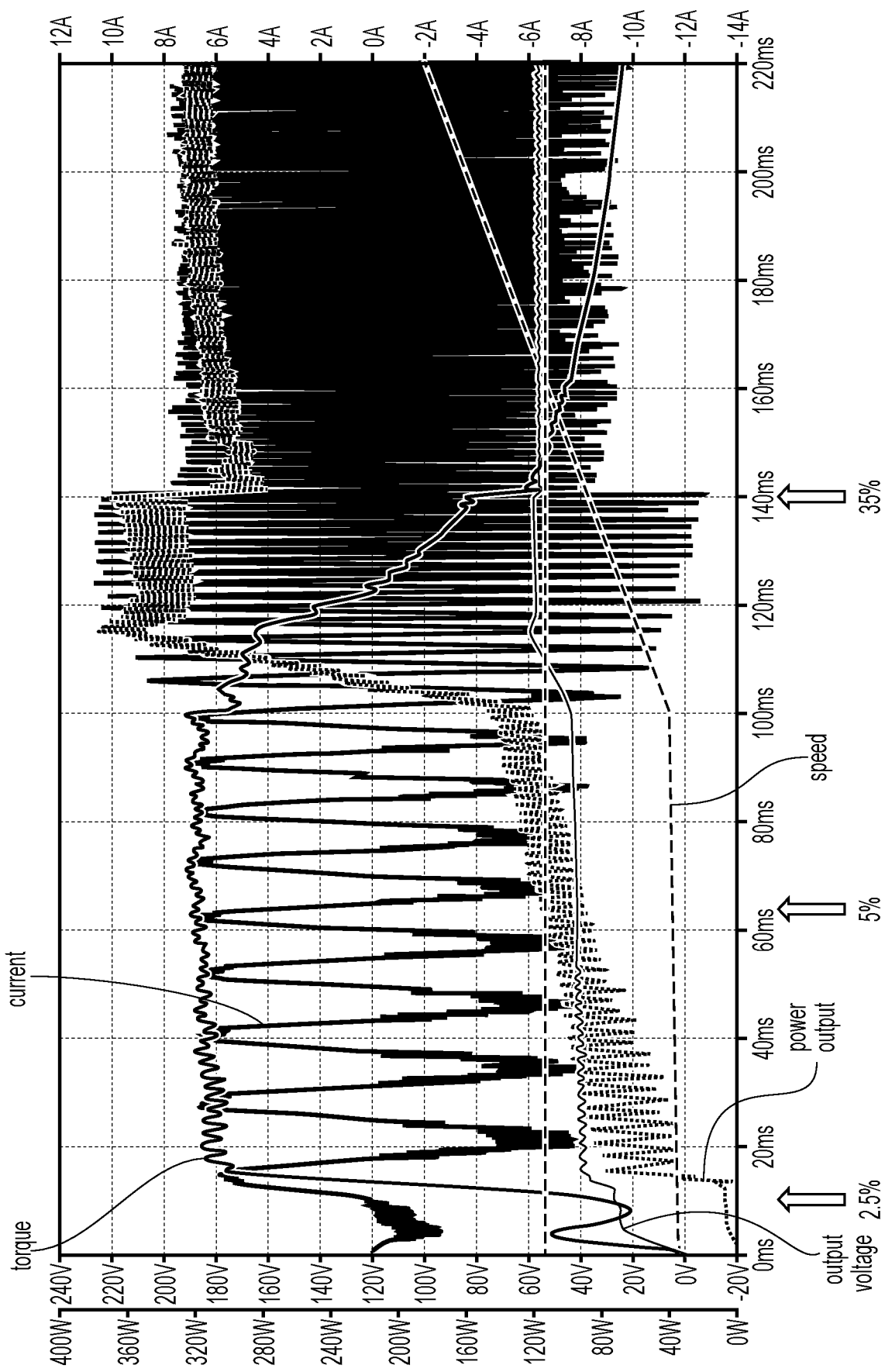
FIG. 4 shows a simulated performance of the electrical machine of FIG. 2A and FIG. 2B on a graph which plots speed, torque, output voltage, current flow and power output from an individual phase against time.

The machine also has an electrical output regulator 44 configured to regulate the electrical current drawn from the stator windings to produce the appropriate torque control. FIG. 3 shows operation steps that the output regulator goes through to set the machine in the correct operating mode. Conveniently the regulator may perform its functions using suitable pulse width modulation (PWM) modes. FIG. 4 shows the simulated performance of the machine on a graph which plots speed, torque, output voltage, current flow and power output from an individual phase against time as the shaft increases from 0 to 100% speed.

Starting with a stationary machine in which the second rotor is in the first rotational position such that the magnets of the two rotors are in a like-pole to unlike-pole alignment, the shaft 33 begins to turn and the regulator rectifies the output to produce a low output voltage. The regulator initially operates in an "optimal" current controlled PWM mode that short-circuits the stator windings for short periods at the PWM frequency to combine an increasing reaction torque on the second rotor 32 and high power transfer to a load. This PWM mode is "optimal" because it achieves a maximum power current with a maximum reaction torque for a given speed to achieve a best power matching performance. At about 2.5% speed (arrowed on FIG. 4), the torque climbs above the threshold level that forces the second rotor to move to the second rotational position, thereby forcing the magnets to align close to like-pole to like-pole and delivering maximum output. As a result, the reaction torque and the output voltage rise steeply and with further increase in speed climb yet higher. By about 5% speed (arrowed on FIG. 4), the duty cycle of the PWM starts to fall and wider current pulses are delivered to the load by the PWM, which maintains a defined current draw and an increasing output voltage. As the speed increases still further, a voltage control loop begins to override a current control loop and regulator enters a voltage controlled PWM mode in which the current begins to rise but the reaction torque begins to fall from its approximately 1.8 Nm peak at 5% speed. At about 35% speed (arrowed on FIG. 4), the reaction torque falls below the threshold level and as it does so the second rotor moves back to the first rotational position under the bias which seeks to return the magnets to a like-pole to unlike-pole alignment. The average flux seen in the stator falls, and thus the output voltage also drops, but the drawn current remains in regulation.

An advantage of the electrical machine is that it can run at higher flux and running current levels at low rotor speeds, whilst providing the ability to moderate output voltage levels, and deliver greater power output at higher rotor speeds. Also it reduces, rather than increases, losses at high rotor speeds, particularly if an embedded magnet rotor arrangement is adopted. Irrespective of whether surface or embedded magnets are adopted, the machine can default to a safe low-output condition without intervention from the output regulator, and thus has a safe failure mode.

Also the machine is compatible with being operated in both rotation directions. For example, if bi-directional operation is needed, the second rotational position of the second rotor 32 can be replicated on the other angular side of the first rotational position.

Although discussed above in relation to an aero gas turbine engine, with the electrical machine and its regulator as described above being typical of a dedicated power application, the concept can be used in a range of fields, particularly where there is a two-step performance requirement or a wide operating speed range. This could include traction and small/medium power generation in the fields of vehicular transportation and industrial machinery, e.g. where starting torque and high terminal speed are defining requirements.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. An electrical machine having:
   a stator with windings;
   a first rotor rotatably fixed relative to a drive mechanism, the first rotor being radially inwards of the stator, the first rotor carrying alternating polarity first field magnets arranged in a circumferential direction of the first rotor,
   wherein, on rotation of the drive mechanism, the windings interact with the magnetic flux produced by the first magnets to create an EMF across the windings;
   a second rotor inwards of the stator, the second rotor carrying alternating polarity second field magnets arranged in a circumferential direction of the second rotor, the second rotor having a first rotational position relative to the first rotor in which the second magnets of the second rotor are aligned relative to the first magnets of the first rotor to reduce the magnetic flux energy of the combined magnets of the first and second rotors, the second rotor having a second rotational position relative to the first rotor in which the second magnets of the second rotor are aligned relative to the first magnets of the first rotor to increase the magnetic flux energy of the combined magnets of the first and second rotors, and the second rotor being freely rotatable relative to the drive mechanism, by a distance of at least between the first and second rotational positions; and
   an electrical output regulator configured to regulate an electrical current drawn from the windings to produce a torque on the first and second rotors, wherein, as the drive mechanism increases from zero rotational speed, the torque rises above a threshold level that moves the second rotor from the first rotational position to the second rotational position, and, as the drive mechanism further increases the rotational speed, the torque peaks and then drops below the threshold level to move the second rotor back to the first rotational position, and wherein as the drive mechanism increases from zero or low rotational speed, the second rotor is in the first rotational position relative to the first rotor, the electrical output regulator is configured to operate a current controlled pulse width modulation mode that intermittently short circuits the windings for short periods at a pulse width modulation frequency until the torque rises above the threshold level.

2. The electrical machine according to claim 1, wherein the field magnets are permanent magnets.

3. The electrical machine according to claim 1, wherein the field magnets are radially magnetised surface magnets.

4. The electrical machine according to claim 1, wherein the field magnets are embedded magnets.

5. The electrical machine according to claim 1, wherein the circumferential arrangement of the first alternating polarity field magnets is the same as the circumferential arrangement of the second alternating polarity field magnets.

6. The electrical machine according to claim 1, wherein the drive mechanism is a drive shaft which extends along the axis of the first and second rotors, the second rotor being freely rotatable on the drive shaft, by a distance of at least between the first and second rotational positions.

7. The electrical machine according to claim 1, further having an end stop which prevents the second rotor from rotating beyond the second rotational position.

8. The electrical machine according to claim 1, further having an end stop which prevents the second rotor from rotating beyond the first rotational position.

9. The electrical machine according to claim 1, wherein the first and second rotors are axially adjacent each other with a sliding interface therebetween.

10. The electrical machine according to claim 1, wherein the electrical output regulator performs pulse width modulation electrical output regulation.

11. A gas turbine engine having an auxiliary gearbox and the electrical machine of claim 1, the drive mechanism of the electrical machine being powered by the auxiliary gearbox.

* * * * *